F. BALTZER.
CAGE FOR ANTIFRICTION BEARINGS.
APPLICATION FILED NOV. 12, 1908.
1,114,331.
Patented Oct. 20, 1914.
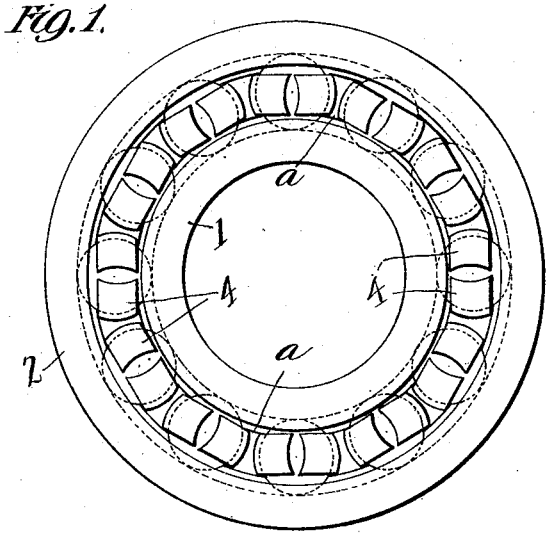
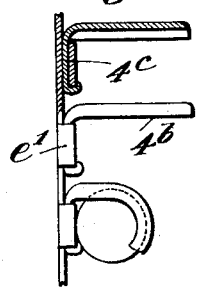
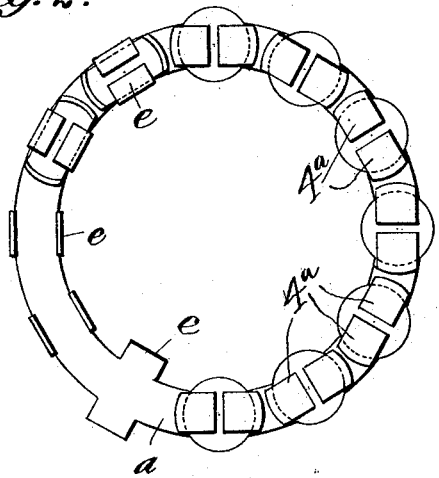
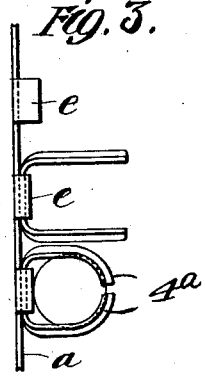
Witnesses:
Frank S. Ober
M. Fleck
Inventor
Friedrich Baltzer
By his Attorneys
Rogers & Kennedy

UNITED STATES PATENT OFFICE.

FRIEDRICH BALTZER, OF BERLIN, GERMANY.

CAGE FOR ANTIFRICTION-BEARINGS.

1,114,331.  Specification of Letters Patent.  Patented Oct. 20, 1914.

Application filed November 12, 1908. Serial No. 462,293.

*To all whom it may concern:*

Be it known that I, FRIEDRICH BALTZER, a subject of the Emperor of Germany, residing at Berlin, Germany, have invented certain new and useful Improvements in Cages for Antifriction-Bearings, of which the following is a specification, reference being had therein to the accompanying drawing.

This invention relates to anti-friction bearings in which the rolling members are mounted between casing elements, and has reference more particularly to the form and construction of the cage or spacing device usually employed to maintain the rolling members in spaced relations, and embodying usually a ring or support equipped with ball holding members.

The invention consists of various features of novelty, directed to the production of a light and inexpensive cage; to the formation of the holding members so that they may be detachably interlocked with the support, and capable each of holding a single ball independently of the other members; to the construction of the members of a material to adapt them by deformation to resiliently hold the balls and be detachably connected with the ring or support; to the construction of the holding members from a single piece of material; and to various other features of construction, which will be described in the specification, and their novel parts pointed out in the claims.

Referring to the drawings: Figure 1 is a plan view of a bearing equipped with a spacing cage constructed in accordance with my invention in its preferred form. Fig. 2 is a plan view of the cake removed from the bearing, with certain of the rolling members in position, and others removed, and with certain of the holding members omitted to show the means for detachably confining them in place on the support. Fig. 3 is a side elevation of a portion of said cage. Fig. 4 is a side elevation partly in section of a portion of a modified form of the cage.

In the accompanying drawing: In its preferred form, as illustrated in Figs. 1, 2 and 3, my improved cage comprises a supporting ring *a* adapted to fit in between the inner and outer casing elements 1 and 2 respectively of the bearing, and a series of ball holding members fastened to said support, and formed each with opposing holding or clamping fingers 4, between which the balls are embraced.

The holding members are formed each from a single piece or strip of thin metal, bent into U-form and confined removably on the supporting ring by means of lips or clips *e*, projecting from the opposite edges of the ring and bent inwardly and downwardly on the base or body portion of the U-shaped member, the limbs of the same being bent inwardly on the balls, as shown, to hold them in position. As a result, the limbs of the U-shaped member practically surround the entire surface of the ball, which is thus held firmly but resiliently, with a spring pressure between the limbs. From this construction it will be observed that each holding member retains its ball independently of the other, so that by setting the several members close together around the ring, as shown, the balls may be arranged very close together and nearly the full complement used. Furthermore, it will be observed that by reason of the manner of fastening the loops to the supporting ring, they may be readily and individually detached without the necessity of employing special tools, it being only necessary to bend the confining lips *e* upwardly to release the members. This is of advantage and importance in the event of its being desirable to replace a worn or injured clamping member, and by reason of the fact that each member holds its ball independently of the other, the removal of one will release but the one ball, the other balls being undisturbed.

By forming the holding members of a deformable material, that is, a material adapted to be bent to change its form, they may be so interlocked with the ring, as in the manner shown, that their independent movement may be effected at will and without the use of special tools such as would be necessary if the holding members were riveted to the ring.

In the modified construction shown in Fig. 4 the ball holding members do not embody opposing holding fingers, but one finger $4^b$ being employed, one end of which is bent around the partial circumference of the ball to confine the same, while its opposite end is bent laterally to form a foot $4^c$, which is seated on the supporting ring and removably fastened in place by a single lip *e'* projecting from the edge of the ring and bent inwardly and downwardly on the foot.

In setting up or assembling the parts of the bearing, the cage and balls are assembled in the casing elements with the holding members in an unfinished form represented in Figs. 3 and 4, whereupon these unbent portions of the holding members are, by suitable means, bent down on the balls so as to embrace and retain them yieldingly in place, this action being permitted by the character of material used in the formation of the members, which when bent down as described, to embrace the balls, will hold them resiliently and with a spring pressure.

While the invention is shown applied to a radial bearing, it may be employed also in connection with thrust-bearings, without material change in operation or function.

It is to be understood that the invention is not limited to any specific form or arrangement of the parts, except in so far as such limitations are specified in the claims.

Having thus described my invention, what I claim is:

1. A ball holding cage for ball bearings comprising, in combination, a supporting ring provided with confining lips, and ball holding members seated on the ring and confined thereon by said lips.

2. A ball holding cage for ball bearings comprising, in combination, a supporting ring provided on opposite edges with opposing confining lips, and a series of ball holding members seated on the ring and confined respectively by the opposing lips.

3. A cage for ball bearings composed of a ring insertible in a ball race, a plurality of resilient fingers having body portions bearing on said ring, balls disposed in said fingers, and clips engaging said fingers and securing them to said ring, said clips engaging opposite edges of the body portions of said fingers.

In testimony whereof I affix my signature in presence of two witnesses.

FRIEDRICH BALTZER.

Witnesses:
WOLDEMAR HAUPT,
HENRY HASPER.

Copies of this patent may be obtained for five cents each, by addressing the "Commissioner of Patents, Washington, D. C."